United States Patent Office 2,766,590
Patented Oct. 16, 1956

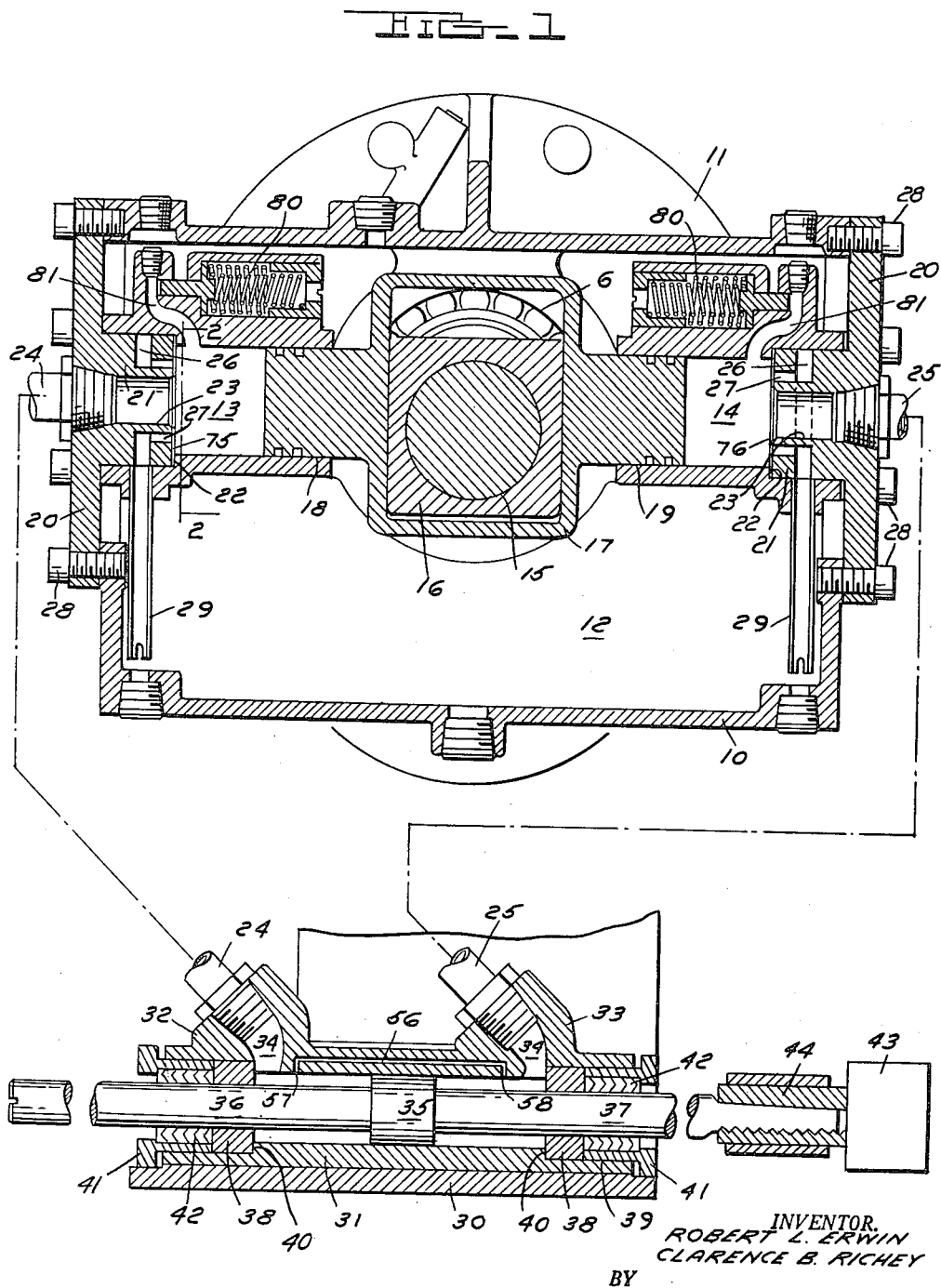

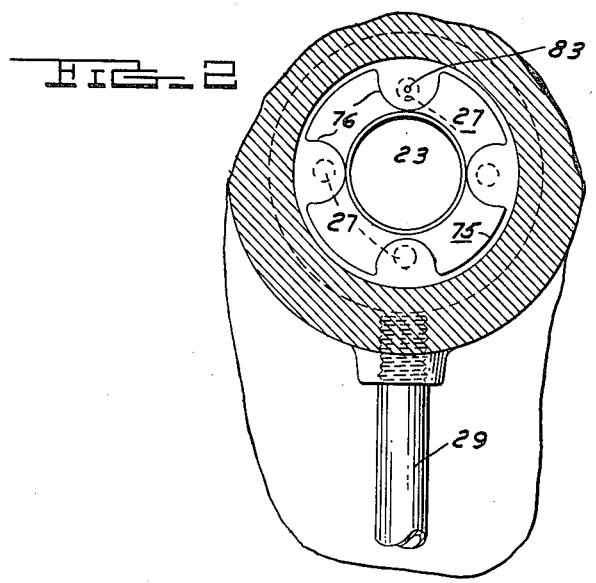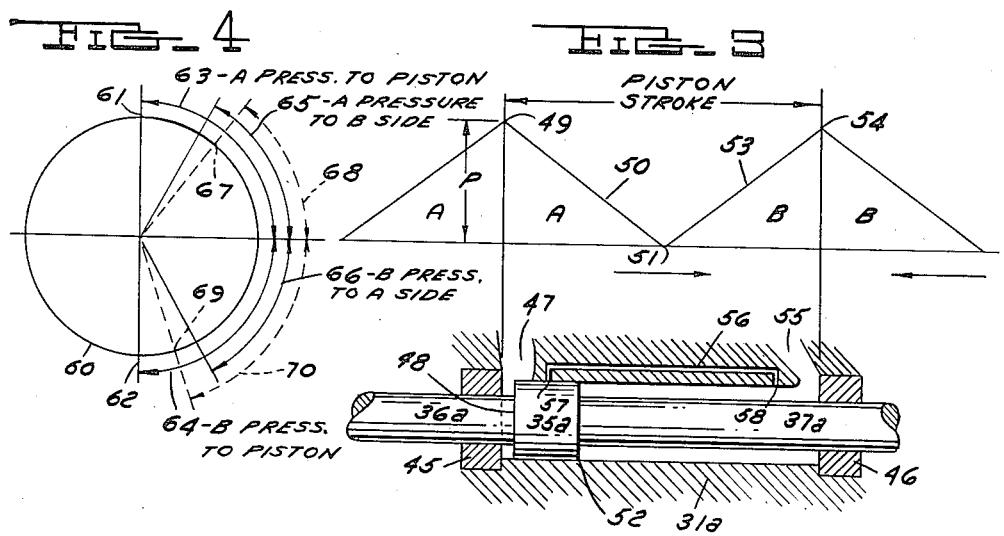

2,766,590

FLUID PRESSURE SYSTEM FOR MOTIVATING A RECIPROCATING LOAD

Robert L. Erwin, and Clarence B. Richey, Royal Oak, Mich., assignors, by mesne assignments, to Ford Motor Company, Dearborn, Mich., a corporation of Delaware Application October 18, 1951, Serial No. 251,972

4 Claims. (Cl. 60—54.5)

This invention relates to improvements in the construction of fluid pressure actuated cylinders incorporating a reciprocating piston, to improvements in the construction of power units adapted to motivate such a fluid pressure actuated cylinder, and has particular application to instances where a reciprocating load is attached to the cylinder assembly and is adapted to be motivated thereby.

The invention offers a simple solution to the problem of keeping a reciprocating piston properly centered in its cylinder. In fluid pressure installations of this type considerable difficulty has heretofore been experienced from the tendency of the piston to drift towards one end of the other of its cylinder, which, in addition to producing a difference in the length of strokes, also is usually accompanied by excessively noisy operation and the possibility of damage to the piston or other parts of the mechanism due to their contacting some sort of positive stop defined either by the construction of the cylinder itself or employed to control the motion of the load. This drift is due to the difficulty in constantly supplying an equal volume of fluid to each end of the piston and in maintaining equality of pressure conditions of the fluid supplied. Any one of a number of factors such as manufacturing tolerances, unequal wear, leakage, etc. can result in a discrepancy between the pressure volume of fluid supplied to one end of the cylinder as compared to that supplied to the opposite end thereof.

A closed type of fluid pressure system is usually employed in driving a reciprocating piston, that is, a system where the power unit and piston each have two sides and the fluid supplied by one side of the power unit to one side of the piston is returned back to that side of the power unit during the application of fluid to the other side of the piston. The problem of keeping the piston centered in such a closed system is aggravated by the fact that the fluid has no opportunity to be cooled by circulation. As its temperature gradually increases during operation with a consequent decrease in viscosity, equality in the volume and pressure condition at opposite ends of the cylinder becomes harder to maintain.

The present invention, in addition to offering a means of keeping the piston centered in its cylinder, also offers a means of accomplishing such centering action in combination with a means for providing circulation of fluid in what would otherwise be a closed type of system. The objects and advantages of the invention will appear more fully in the following detailed description of the representative embodiments thereof disclosed in the accompanying drawings which comprise the following views:

Figure 1, a cross sectional elevation through a power unit of representative construction adapted to alternately deliver pressure to each side of a driven piston, a representative construction of which is also shown in cross sectional elevation. Pressure lines connecting the respective ports of the power unit and driven cylinder are indicated in phantom;

Figure 2, a section taken along the line 2—2 of the power unit shown in Figure 1 and showing the construction of a replenishing valve employed between the cylinder of the power unit and ports leading to the reservoir thereof;

Figure 3, a schematic showing of a cylinder and piston assembly in association with a diagram indicating the variation in pressure prevailing in such cylinder and piston assembly during a stroke of the piston when a reciprocating load is attached thereto; and Figure 4, a pressure-time diagram showing variations in pressure through one cycle of operation of the driven piston and indicating the variation in such pressure which accompanies a drifting of the piston toward one end of the cylinder.

As shown on the drawings:

Referring to Figure 1, the specific construction of the power unit thereshown forms no part of the present invention. Any type of double-acting power unit may be employed for driving the reciprocating piston shown associated with this unit. Some of the more important parts of the unit, however, will be briefly mentioned in order that the present invention and its setting may be fully understood.

The power unit includes a casing 10 having a flange 11 for mounting the unit in position to be driven by some suitable form of motive power; and enclosing, as principal elements, a reservoir 12 and left and right-hand cylinders 13 and 14 respectively. The main power shaft of the unit, which has its center defined by the center of the bearing 6, is provided with an eccentric portion 15 on which a block 16 is journaled. This block engages a yoke assembly 17 which includes left and right-hand pistons 18 and 19 respectively, these pistons being mounted for sliding movement in the cylinders 13 and 14 as imparted by the eccentric 15, block 16 and yoke 17. It will be recognized that this driving arrangement produces sinusoidal variations in the velocity of pistons 18 and 19, having zero velocity at either end of their strokes and achieving maximum velocity at the center of the respective strokes.

The end of each cylinder is closed by a cap 20 formed with a plug-like portion 21 which projects into the cylinder bore and seats on a recess formed by a shoulder 22. Each cap 20 is bored centrally with a hole 23 which forms the main port of each cylinder, this hole being threaded for the attachment of the fitting of a left-hand pressure hose 24 and a right-hand pressure hose 25. Each cap is also formed with an annular recess 26 and four holes 27 are bored communicating with this recess from the inner face of the plug-like portion of the cap, as is more clearly brought out in the sectional view of Figure 2. Bolts 28 attach each cap to the casing 10 of the unit, and when the caps are in attached position, the annular recess 26 of each communicates with the reservoir 12 of the unit through a sump pipe 29.

The driven cylinder assembly is shown mounted on a base plate 30 and consists of a barrel casting 31 formed with left and right-hand bosses 32 and 33, respectively, each being cored to provide a port 34 communicating with each end of the cylinder, and internally threaded for the attachment of the hoses 24 and 25.

A piston and rod assembly of unitary construction is shown mounted within the cylinder 31, this construction comprising a piston 35 having left and right-hand rods 36 and 37 respectively projecting from each of its working faces. These rods are of the same diameter so that the working area on each side of the piston is equal. Each rod slides within an end bearing block 38, each of these bearing blocks fitting within a recess 39 formed at each end of the cylinder 31 and abutting against a shoulder 40 forming the end of such recess. The blocks 38 are held in position by end caps 41 which also act to retain chevron type seals 42.

A load, schematically illustrated by the box 43, is attached to the end of the right-hand rod 37 by a suitable clamp 44. This load is not shown in detail as it may be any device operating with reciprocating motion, such as the sickle knife of a mower.

These elements, double-acting power unit and reciprocating cylinder and piston assembly, form the setting for the present invention. As previously mentioned, one of the principal problems with this combination of mechanical elements, is that of keeping the piston centered within the cylinder assembly so that each stroke of the piston is equal and so that the piston does not drift toward, or be driven against, an end wall of the cylinder on one of its strokes. The solution of the problem of drift or centering stems from an analysis of pressure conditions that obtain within the cylinder when a reciprocating load is driven.

Referring briefly to Figure 3, the graphic diagram positioned above the schematic representation of a piston and cylinder assembly, shows the variation in pressure within the cylinder during one stroke of the piston. The piston 35a is shown adjacent the left-hand end wall 45 of the cylinder 31a, and in position to begin a stroke toward the right-hand end 46 of the cylinder. Fluid pressure, applied through the left-hand port 47, acts upon the left-hand face 48 of the piston, this pressure being indicated by the starting point 49 of the pressure line 50 of the graph. As the piston 35a begins its movement to the right, this pressure is a maximum due to the inertia of the piston 35a and its connected load, but the pressure gradually decreases to a zero point 51, which occurs at approximately the mid point of the stroke, at which point the piston 35a has achieved a maximum velocity corresponding to the maximum velocity of pump piston 18. Since the line 50 represents pressure appearing upon the left-hand face 48 of the piston, the area under line 50, indicated by the letter A, represents energy imported to piston 35a and its load. At the zero point 51, the velocity of pump pistons 18 and 19 decreases so that the inertia of the moving parts of the piston assembly and the load attached thereto cause a gradual build-up of pressure on the right-hand face 52 of the piston 35a, as indicated by the line 53 of the curve, to decelerate piston 35a. The area under the line 53, indicated by the letter B, therefore represents energy returned to the system by deceleration of piston 35a (neglecting friction & load losses). Thus, a reversal of pressure takes place in the cylinder during each stroke of the piston. On the return, beginning at the point 54, pressure is applied through right-hand port 55 to the right-hand face 52 of the piston, a similar pressure line results, and the pressure again reverses from the right-hand to the left-hand face of the piston at approximately the midpoint of the stroke.

This reversal of pressure is employed to keep the piston centered within the cylinder by providing a reverse pressure by-pass conduit, indicated by the reference 56 on both Figures 1 and 3, which conduit is of restricted area and provides a communicating passage from one end of the cylinder to the opposite end except when either the left-hand or right-hand opening 57 or 58 respectively is blocked by the piston 35. This reverse pressure by-pass is located so that the openings 57 and 58 thereof are positioned at equal distance from their respective ends of the cylinder and so that they will normally be alternately closed during the end portion of each stroke of the piston.

Figure 4 is a pressure-time diagram which offers a convenient means of explaining the centering action of the passage 56. In this diagram, 180° of the circumference of the circle 60 (that is, between the points 61 and 62) represents one stroke of the piston 35a. This stroke will be assumed to be the left to right stroke depicted in the full portion of the pressure displacement diagram of Figure 3. During the time it takes the piston to cover half of this stroke, i. e. 90° of clockwise movement around the circle 60 starting from the point 61, pressure is applied to the left-hand face 48 of the piston, as indicated by the arc 63, labeled "A Pressure to Piston." During the next 90° of travel around the circle 60, ending at the point 62, pressure builds up on the right-hand face 52 of the piston, as indicated by the 90° arc designated 64 and labeled "B Pressure to Piston." Arc 63, then, corresponds to the line 50 of Figure 3 while arc 64 corresponds to the 53 thereof.

Assuming that the piston 35a is centered within the cylinder 31a, and with the rate of acceleration and deceleration of the piston during one stroke being substantially equal, the piston will close the left-hand port 57 of the by-pass passage 56 for a time approximately equal to the time the piston closes the right-hand port 58 of such passage at the end of the stroke. As the piston 35a begins its stroke and uncovers the left-hand port 57, the pressure on the face 48 of the piston will cause the flow of a limited amount of fluid through the port 57 and passage 56 and to the B side of the piston. The time this flow continues is indicated in Figure 4 by the arc labeled 65 and designated "A pressure to B side." When the pressure reverses at approximately mid-stroke, this flow through the by-pass passage 56 will also reverse, fluid entering the passage through port 58 and moving from B to the A side of the piston. The time this flow continues is indicated by the arc 66 of Figure 4, labeled "B Pressure to A Side," this flow of course ceasing when the piston closes the port 58. With the piston centered so that the ports 57 and 58 are closed for an equal length of time, the amount of fluid that flows from one side of the piston to the other through the by-pass passage will be approximately equal and opposite and the net effect will be negligible.

Assuming, however, that the piston 35a has drifted toward the left-hand end of the cylinder 31a so that the port 57 will be closed by the piston for a longer time than will the port 58, then, the by-pass passage will act to produce a corrective or centering action. This again is illustrated by Figure 4. If the port 57 is closed for a longer time due to the piston drifting toward the left-hand end of the cylinder, the opening of this port to A pressure, as the piston moves to the right, will be delayed. For the sake of illustration, it will be assumed that this port will open at the point 67 on the circumference of the circle 60, and the length of time it will be open to by-pass A pressure to B side of the piston will then be indicated by the arc 68, shown in dotted lines. Port 58, however, which is open to B pressure, as soon as the reversal of pressure takes place within the cylinder, will be open for a longer length of time due to the drift of the piston to the left, and for the sake of illustration, it will be assumed that port 58 will be open until a point 69 is reached on the circumference of the circle 60. B pressure will flow then to the A side of the piston 35a during the length of time indicated by the arc 70, also shown in dotted lines. Thus a greater volume of fluid will flow through the by-pass passage 56 from the right or B side of the piston to the left or A side thereof and this will produce a gradual centering of the piston until the condition depicted in full line in Figure 4 again obtains.

The centering action of the by-pass passage can also be employed to effect a nominal amount of circulation of fluid in what otherwise would be a closed system. Referring for a moment to the operation of the pump unit and cylinder assembly, Figure 1, it will be assumed that the pump unit main shaft is driven in a clockwise direction. With the parts in the position shown, the lefthand piston 18 will be approximately mid-way on its pumping stroke and will be supplying fluid from the cylinder 13 through the pressure line 24 and to the left-hand or A side of the piston 35, which will then be moving toward the right, as the parts are viewed in this figure. At the same time, fluid will be returning to the pump unit from the B side of the piston 35 through the line 25 to the cylinder 14 of the pump unit. Before the pressure reverses from A to B side, any deficiency of fluid in the cylinder 14 will be drawn from the reservoir 12 through the stand pipe 29, passage 26 and replenishing port 27 in the end cap 20. This flow of fluid is controlled by a replenishing valve 75 which, as more clearly appears from Figure 2, is a ring of thin flexible material formed with four flaps 76 which project inwardly from the ring and when the valve is in position shown, cover the replenishing ports 27. This replenishing valve 75 is of the flap-type and positively closes the replenishing ports when pressure in the pump cylinder is positive.

In the event that any excess pressure is built up in either of the pump cylinders 13 or 14, this pressure is relieved and fluid by-passed directly to the reservoir by the operation of a pressure release valve 80 communicating with the cylinder through a passage 81.

The left and right-hand replenishing valves are identical with one exception, this exception being shown in Figure 2, which depicts the construction of the left-hand valve. It will be noted that a small orifice 83 is provided in the uppermost flap 76 of this valve. This orifice communicates with one of the replenishing ports 27 and allows a small amount of fluid to return to the reservoir whenever the pressure in the pump cylinder 13 is positive. Thus, during the initial part of the movement of the left-hand pump piston 18 toward the left in Figure 1, a certain amount of fluid will flow through the orifice 83 of the replenishing valve to the reservoir, rather than through the pressure line 24 to the driven cylinder 31. The right-hand replenishing valve has no orifice. Hence, when the cycle of operation reverses and the right-hand pump piston 19 is supplying fluid to the driven cylinder, B side, a greater volume of fluid is delivered than was delivered to the A side of the piston 35 due to the effect of the orifice. The piston 35 will therefore tend to drift toward the left-hand end of the cylinder, initiating the centering action depicted in Figure 4 and previously explained, and resulting in more fluid flowing from the B side of the piston 35 to the A side thereof through the by-pass centering passage 56, in an attempt to correct for this drift.

In order for this to result in proper circulation, the size of the orifice 83 must be less than the size of the by-pass passage 56, otherwise the by-pass passage would not be able to handle the excess volume of fluid continually supplied by the pump unit to the right-hand side of the piston assembly 35. As long as this volume of fluid is not more than can be handled by the by-pass passage, the net effect will be for the pump unit to continually draw fluid from its reservoir 12 to supply its right-hand cylinder 14 while continually returning fluid from its left-hand cylinder 13 to the reservoir. The driven piston 35 will continually be displaced slightly toward the left of its cylinder assembly 31 so that centering action as well as circulation is continually taking place while the units are in operation.

We claim:

1. In a fluid motor having a double-acting piston operable within a cylinder, motor working pressure being exerted upon the piston through substantially one-half of the piston stroke and piston inertia loads assisting completion of the piston stroke, the improvement of means to keep the reciprocable working strokes of said piston substantially equal and centered between the ends of said cylinder, comprising a restricted passage located exteriorly of said cylinder, and having its ends connected to entrance ports formed in the side walls of said cylinder, said entrance ports being spaced an equal distance from each end of said cylinder, and being alternately closed by said piston during the end portion of each working stroke thereof and open during a medial portion of the stroke of said piston.

2. A double-acting hydraulic system for imparting a reciprocating motion to a load and comprising a pump unit and a driven cylinder unit, said driven cylinder unit including a piston having two working faces of substantially equal area and a rod for imparting motion of said piston to said load, said pump unit including means for alternately delivering a volume of fluid under pressure to a port adjacent each end of said cylinder unit, motor working pressure being exerted upon the piston through substantially one-half of the piston stroke and piston inertia loads causing completion of the piston stroke, means for shunting a portion of said volume of fluid around said piston in one direction during the exertion of pump working pressure thereon and for shunting a substantially equal volume of fluid around said piston in the opposite direction during completion of the piston stroke, said means comprising a restricted passage leading from an entrance port adjacent one end of said cylinder to an entrance port adjacent the other end thereof, said entrance ports being positioned equally distant from the medial point of piston travel so that they are alternately closed an equal interval by said piston during each working stroke of said piston so long as said piston stroke is centered in said cylinder and said ports are closed an unequal interval by said piston when the stroke thereof is not centered.

3. The invention set forth in claim 2 wherein said pump unit is of the dual type having two pumping chambers arranged to alternately deliver substantially equal volumes of fluid, a reservoir, a replenishing valve between the said reservoir and each of said pumping chambers, and means for shunting fluid past each of said replenishing valves during the pumping stroke of the respective pumping chambers.

4. The invention set forth in claim 2 wherein said pump unit includes a pair of cylinder and piston units, a reservoir, and a restricted orifice communicating between the delivery end of one of said piston and cylinder units and said reservoir.

References Cited in the file of this patent

UNITED STATES PATENTS

| | | |
|---|---|---|
| 1,939,851 | Horste | Dec. 19, 1933 |
| 1,966,608 | Cardwell et al. | July 17, 1934 |
| 2,551,274 | MacDuff | May 1, 1951 |